Figure 2:
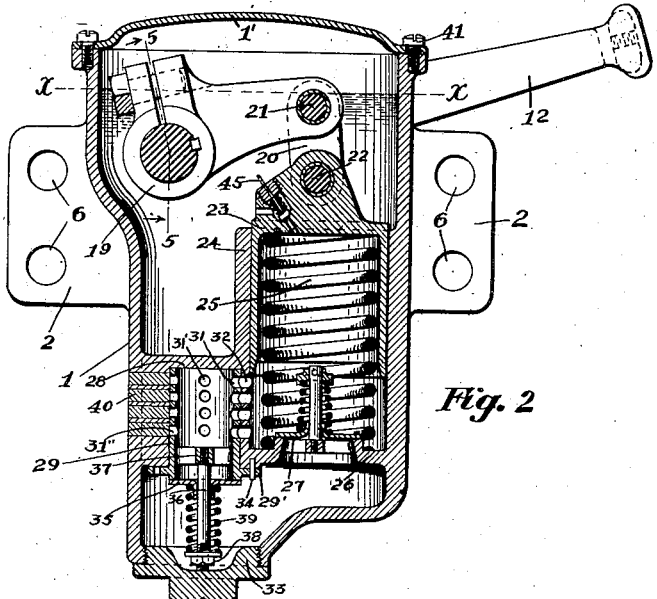

April 27, 1926.

P. W. SIMMONS

SHOCK ABSORBER

Filed June 22, 1925

1,582,551

Inventor:
Philip W. Simmons

Patented Apr. 27, 1926.

BEST AVAILABLE COPY 1,582,551

UNITED STATES PATENT OFFICE.

PHILIP W. SIMMONS, OF PORTLAND, MAINE.

SHOCK ABSORBER.

Application filed June 22, 1925. Serial No. 38,805.

*To all whom it may concern:*

Be it known that I, PHILIP W. SIMMONS, a citizen of the United States, residing at Portland, in the county of Cumberland and State of Maine, have invented new and useful Improvements in Shock Absorbers, of which the following is a specification.

My invention relates to a device used principally in connection with motor vehicles for the purpose of resisting and cushioning the shock occasioned by the rebound of the body due to the action of the vehicular springs when the vehicle is passing over rough or uneven surfaces of the road-bed.

The principle upon which my device, which is known in the arts as a shock-absorber, operates, is based on the well known law of physics whereby a fluid forced through a restricted passage increases its speed and at the same time tends to check or retard the movement of the impelling agent.

I am aware of the fact that the application of this natural law governing the action of fluids under pressure has, in a general way, been taken advantage of by others in the construction of shock-absorbers.

In my present invention, however, I have endeavored to advance one step beyond the conventional method heretofore quite generally employed of using fluid for the before mentioned purpose, and I have, therefore, for one of the objectives, sought to procure a more gradual checking or retarding of the sudden upward movement of the vehicle body by applying the power to resist this movement in a continuously increasing amount,—beginning with a comparatively slight restraint and augmenting the potency of the resistance as the body continues in its upward movement.

Another object, quite intimately connected with the one just mentioned, is to provide means whereby, at different times, resistance in varying degrees or amounts might be obtainable.

By a simple and convenient method of bringing into action, singly, one of several groups having, relatively, dissimilar sized apertures, through which the fluid must pass, I can obtain a considerable scope or range of, what I shall term, positive resistance to control the movements of the actuating parts.

Another object is to combine with this positive or set resistance a yielding one, so that in all moderate vertical movements of the body the shock-absorbing duty will devolve, principally, upon a check-valve, susceptible of adjustment for varied strength of resistance. During these periods of slight body movements the major shock resisting ability of the absorber will not be demanded, and it is essential that the function of the ordinary spring suspension of the vehicle body be exercised without undue restraint, so that the comfortable riding quality of the vehicle may be preserved.

A still further object is to provide a feature which allows all of the absorbers in any particular installation to be of identical design, eliminating the necessity of employing dissimilar absorber units for the right and left hand sides of the vehicle.

Figure 3:
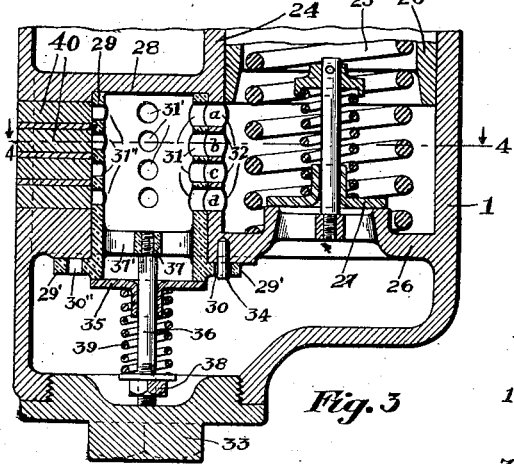
Figure 1:
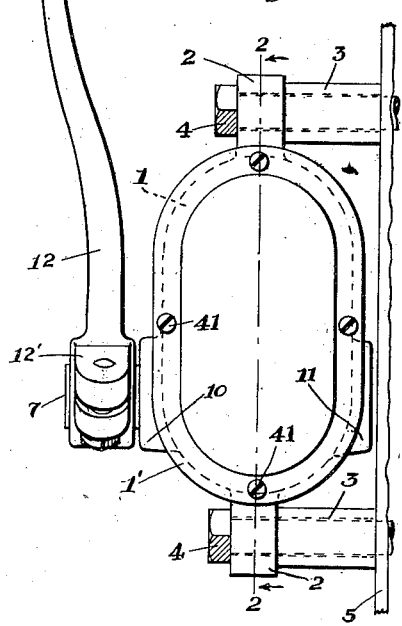
Figure 5:
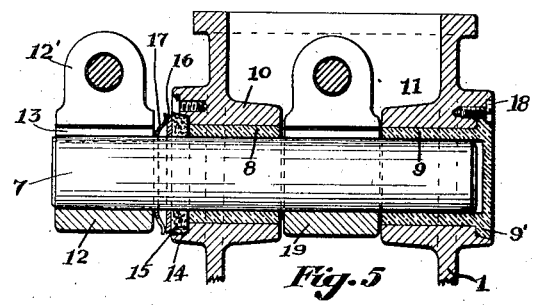
Figure 4:
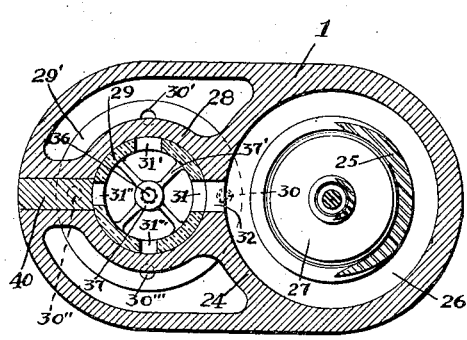

With these and other objects in view the invention consists in certain novel features of construction as hereinafter shown and described and more specifically pointed out in the claims, and in the drawings illustrative of the preferred embodiment of my invention, Fig. 1 represents a plan view of my shock-absorber;

Fig. 2 a sectional elevation thereof, taken on line 2—2, Fig. 1;

Fig. 3 an enlarged fragmentary sectional elevation embodying some of the more essential elements in my absorber;

Fig. 4 a sectional plan view, taken on line 4—4, Fig. 3;

Fig. 5 a sectional view showing the actuating shaft and bearings, and

Figure 6:
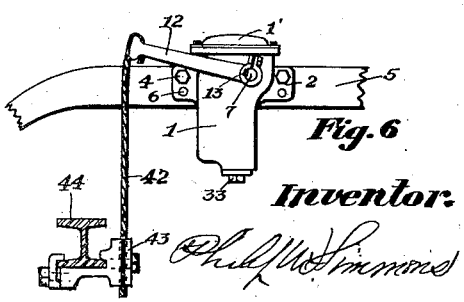

Fig. 6 a side elevation of the shock-absorber shown attached to the frame of a motor vehicle.

Similar characters of reference refer to similar parts in all the different views of the drawing.

Referring to the drawing, 1 is the case or body of the shock-absorber and 2, 2, the ears by which the body is secured to the vehicle. Interposed between these ears (2) and the motor vehicle frame are the sleeves 3, through which the bolts 4 pass to clamp the absorber rigidly to the frame 5,—the nuts (not shown) being on the inner side thereof. The holes 6 in the ears 2 are preferably four in number so as to provide means to secure the absorber in different positions, vertically, on the vehicle.

It will be observed that the ears 2 are located substantially on the center line of the absorber body 1, the object being to make the same and identical pattern serve for all the absorber units on both sides of the vehicle. However, in making installation of these units a transposition of some of the elements therein must be made, about which more will be said hereinafter.

Referring to Figs. 1 and 5, the shaft 7 is oscillatively mounted in the bushings 8 and 9, the latter making light press fits in the housings 10 and 11 respectively. On the outer end of the shaft (7) is a lever 12, having a split hub 12′ and key 13 by which it may be secured rigidly to the shaft 7. In the housings 10 and 11 I provide means to prevent the escape of oil from the body member (1). A tapering counterbored hole 14 receives the cork or leather washer 15, the periphery of the latter fitting the counterbored hole and its bore tightly hugging the shaft 7. Outside the washer (15) is a metallic washer 16 and impinging on the latter is a concave spring washer 17. A considerable thrust or inward pressure is given this spring washer by the hub of the lever 12, when assembling the parts, and the tapered face of the former tends to compress it sufficiently to insure a tight oil closure over the shaft (7). The bushing 9 has a closed outer end with a flange 9′ fitting the counterbored tapered hole in the housing 11. These counterbored holes are similar in both housings 10 and 11. The screw 18 secures the bushing 9 in place.

Should the lever 12 be required on the opposite side of the body 1, the clamp screws on the lever and the rocker are released, the shaft and bushing 8 withdrawn, the bushing 9 removed after removal of the screw 18, and then all parts are re-assembled in a reverse order, that is, the bushing 8 in the housing 11, the bushing 9 in the housing 10 and the washers and lever placed on the side of and adjacent to the housing 11,—the shaft being reversed from its former location.

Secured to the shaft 7, between the housings 10 and 11, and in much the same manner as is the lever 12, is a rocker 19, having at its outer end proper connecting links 20 which operate over the pin 21 in the rocker, and pin 22 in the upper end of the piston 23, the latter reciprocably mounted and operable within the cylinder 24. A helical spring 25 assists somewhat in resisting the downward movement of the piston, but principally serves to return the latter and the shaft 12 to their normal positions after being depressed. Placed in the bottom head 26 of the cylinder 24, is a check valve 27, which allows oil, or other fluid adaptable of use in the absorber, to pass therethrough into, but not out of the cylinder 24.

Adjacent the inner wall of the cylinder 25 is another cylinder 28 within which is located a sleeve 29 having a flange 29′ through which are holes 30, 30′, 30″ and 30‴. Opening through the wall of the sleeve (29) are four vertically aligned groups of holes 31, 31′, 31″ and 31‴, all of which groups at predetermined times, singly and alternately being adapted to register with holes 32, drilled through the wall of the cylinder 24.

By reference to Figs. 3 and 4, it will be seen that the adjacent holes in the cylinder 24 and the sleeve 29 are not only in register but are of equal size. This provides for the lowest resisting power of the fluid passing from the cylinder into the sleeve. By rotating the sleeve ninety degrees another set or group of holes,—as for instance the 31′ set, which are of slightly smaller size, may be placed in register with the holes 32; thus with smaller apertures providing a greater resistance to the passing of the fluid, and a consequent greater retarding effect on the piston 23. The other groups, 31″ and 31‴ may be similarly positioned with still further resisting capabilities. The individual holes making up each single group are of similar size, but the holes in one group relative to the other groups vary. The set, therefore, best adapted to give the proper result should be adopted in the operation of the shock-absorber.

To locate the sleeve 29 in different positions within the cylinder 28, the plug 33 must first be unscrewed from the body 1. The sleeve may then be withdrawn a short distance from out of the cylinder 28, or until the hole 30 is clear of the locating pin 34, then turned until the desired set of holes, 31 to 31‴ comes into alignment with the holes 32. On the lower end of the sleeve 29 is a valve 35 reciprocably mounted on the stud 36, the latter fixed in the hub 37, which, by means of the bridges 37′ forms a part of the sleeve. The length of the stud (36) is such that when the plug 33 is in place, the latter abuts on the lower end of the former, thereby holding the sleeve firmly in position, vertically. A nut 38 adjusts the helical spring 39 for greater or less tension on the valve 35.

In drilling the holes 32 it is also necessary to drill through the body 1, adjacent the smaller cylinder 28. These holes are subsequently plugged by the pins 40. A cover 1′ closes the upper open end of the body, and is secured to the latter by screws 41.

In placing the shock-absorber in commission the sleeve 29 is positioned so that the set of apertures, selected from the four groups, registers with the holes 32. The body is then supplied with fluid, preferably oil, until the surface of the same stands on a level approximately with the line x—x, Fig. 1. The cable 42 is then adjusted so as to bring a slight tension on the spring 25, and secured in the clamp member 43.

In operation, the upward movement of the vehicle body will cause a downward movement of the piston 23, compressing the spring 25 and forcing oil from the cylinder 24 through the apertures 32 and 31 and into the sleeve 29, where a further and yielding resistance to the passage of the oil is offered by the valve 35. On the downward movement of the vehicle body the piston will rise, due to the expansion of the spring 25, and open the valve 27, re-filling the cylinder space with oil.

In Figs. 2 and 3 the piston is shown in substantially the position it would assume when the vehicle is carrying an average load. Upon a sufficient upward movement of the vehicle body, the piston will cover, first, the hole 32 at "a." This will leave but three apertures through which to pass the oil. The upward movement of the body continuing, the piston will next cover the hole 32 at "b",—thus far restricting the oil passage by one-half As each opening is closed the resistance is gradually and positively increasing and will do so through approximately the whole length of the piston stroke. After closing the last hole 32 at "d," there will then be no means to pass the oil through the sleeve, so, to prevent a blocking of the piston, should it continue to move downwardly, I provide a valve 45 in the head of the piston, which serves not alone to relieve the pressure but to give vent to any air which may have collected in the chamber of the piston.

The selection of the proper group of apertures for service in the shock-absorber will depend very largely on the weight of the vehicle on which they are installed. But other considerations must be taken into account, among which might be mentioned the resiliency of the vehicle springs, the inflation of the tires, and especially the so-called balloon tires, the speed at which the motor car is usually driven, etc. Sufficient range of sizes of apertures may be provided to cover all ordinary requirements.

A point I wish to stress concerns the substantial continuity of the gradually increasing resistance against the piston throughout the average length of its stroke. To all intents and purposes, the apertures are ports and the piston a valve, and extending these ports, to cover the zone of action of the valve, eliminates in a great measure the sudden pound in the absorber which would result were they all completely closed previous to the completion of the ordinary stroke of the valve.

Having thus described my invention, what I claim is:

1. In a shock-absorber, comprising, in combination, a fluid holding vessel, a cylinder therein, having apertures through the wall thereof, a piston operable within said cylinder, means to actuate said piston, a sleeve located within said vessel and in contiguous relation to said cylinder and having a plurality of groups of apertures therethrough, said groups of apertures, singly and alternately and at predetermined times, being adapted, in cooperation with said apertures in said cylinder, to provide restricted passages of dissimilar and predetermined sizes for the egress of fluid from said cylinder to said vessel, and yielding means supplementing said positive restrictive means to retard the movement, forwardly, of said piston in said cylinder.

2. In a shock-absorber, comprising, in combination, a hollow, open-top body member, a cover for the same, a cylinder within said body member having an open top and apertures through the wall and located a spaced distance from the bottom head thereof, a valve in said bottom head, a piston operable within said cylinder, means to positively actuate said piston on its downward stroke, means to yieldingly actuate said piston on its upward stroke, a second cylinder in contiguous relation to said first mentioned cylinder, a sleeve within said second cylinder, having a plurality of groups of apertures of dissimilar sizes located at spaced distances around, and extending through, the wall thereof, said groups of apertures adapted to be located, at predetermined times, singly and alternately, in axial alignment, and in direct connection, aperture with aperture, with those in the said first mentioned cylinder.

3. In a shock-absorber, comprising in combination, a hollow body member, a cylinder therein, having a plurality of apertures in vertical alignment each with the others and located a spaced distance from the bottom head thereof, a valve in said bottom head, a piston operable in said cylinder, means to actuate said piston, a second cylinder in contiguous relation to said first mentioned cylinder, the adjacent wall to be common to both of said cylinders, a sleeve within and rotatably fitting said second cylinder and having thereon a plurality of groups of apertures extending through, and located at spaced distances around the wall thereof, each group of apertures to be adapted, singly and alternately and at predetermined times, to be placed in register with the plurality of apertures in the wall of the said first mentioned cylinder, and means to secure said sleeve rigidly in various circumferential positions within said second cylinder.

4. In a shock-absorber, comprising, in combination, a fluid receptacle, a cylinder therein having a plurality of apertures through the wall thereof, said apertures being located one above the other and at a spaced distance from the bottom head of said cylinder, a valve in said bottom head, a piston operable within said cylinder, means to actuate said piston, and means to vary, at predetermined times and in predetermined amounts, the effective size of the fluid passages from said cylinder to said receptacle chamber.

5. In a shock-absorber, comprising in combination, a fluid holding vessel, a cylinder within said vessel, having a plurality of uniform and vertically aligned openings through the wall, and located at a spaced distance from the bottom thereof, a valve in the bottom head of said cylinder, adapted to pass fluid into but none out of said cylinder, a second cylinder located contiguously to said first mentioned cylinder, a sleeve operable within said second cylinder and having, through the wall thereof, apertures arranged in vertical groups, the size of the said apertures in the several groups varying, and each group adaptable, singly and alternately and at predetermined times, of alignment with the apertures in first mentioned cylinder, means for securing said sleeve in various positions in said second cylinder relative to the alignment of the apertures in said sleeve with those in said first mentioned cylinder, a valve in said sleeve adapted to permit fluid to pass out of, but none into said sleeve, means to increase or decrease the power of said valve in said sleeve to resist the passage of fluid therethrough, a piston operable in said first mentioned cylinder and adapted to force a fluid from said cylnder through the apertures therein and through the apertures in said sleeve and through said valve into the chamber of said vessel, means to actuate said piston, means on said vessel whereby with a transposition of elements said piston actuating means may be controlled from either side of said vessel, and means to vent the chamber of said piston.

PHILIP W. SIMMONS.